United States Patent [19]

Hasegawa et al.

[11] 4,358,380

[45] Nov. 9, 1982

[54] METHOD OF REPRODUCING WATER-SOLUBLE CUTTING AGENTS

[75] Inventors: Masami Hasegawa, Fuji; Utaro Sakai, Hamamatsu; Takahisa Naitoh, Fuji, all of Japan

[73] Assignees: Nissan Motor Co., Ltd., Yokohama; Maruchi Kohken Co., Ltd., Hamamatsu, both of Japan

[21] Appl. No.: 247,278

[22] Filed: Mar. 25, 1981

Related U.S. Application Data

[63] Continuation of Ser. No. 82,336, Oct. 5, 1979, abandoned.

[30] Foreign Application Priority Data

Oct. 5, 1978 [JP] Japan .................................. 53-122875

[51] Int. Cl.³ .............................................. B01D 15/00
[52] U.S. Cl. .................... 210/679; 210/689; 210/799
[58] Field of Search ................... 210/689, 502–508, 210/679, 680, 690–693, 799, 805

[56] References Cited

U.S. PATENT DOCUMENTS 3,494,863 2/1970 Greenman .......................... 210/680

FOREIGN PATENT DOCUMENTS

| | | |
|---|---|---|
| 2152670 | 4/1973 | France . |
| 2218125 | 9/1974 | France . |
| 2286850 | 4/1976 | France . |
| 2286851 | 4/1976 | France . |
| 628464 | 8/1949 | United Kingdom . |
| 657715 | 9/1951 | United Kingdom . |
| 1500941 | 2/1978 | United Kingdom . |
| 1501554 | 2/1978 | United Kingdom . |

*Primary Examiner*—Ivars C. Cintins
*Attorney, Agent, or Firm*—Schwartz, Jeffery, Schwaab, Mack, Blumenthal & Koch

[57] ABSTRACT

A method of recycling and purifying water-soluble cutting agents is disclosed. The used water-soluble cutting agent is recycled by filtering through an oil-water separating filter consisting of a porous sheet and an oil-water separating layer composed essentially of a water-insoluble and water absorbable gel layer, which is formed on a surface portion of the porous sheet and is adapted to be contacted with the cutting agent and/or surface portions of the porous sheet serving as flow path.

9 Claims, 8 Drawing Figures

METHOD OF REPRODUCING WATER-SOLUBLE CUTTING AGENTS

This is a continuation, of application Ser. No. 082,336, filed Oct. 5, 1979, now abandoned.

This invention relates to a method of recycling water-soluble cutting agents, and more particularly to a method of recycling water-soluble cutting agents so as to recover or retain the function of the cutting agent by filtering the used water-soluble cutting agent through a porous sheet provided with an oil-water separating layer consisting essentially of a water-insoluble and water-absorbable gel layer and having both an oil-resistant and -repellent function and a water-permeable and -absorbable function to remove contaminant substances therefrom.

Throughout the specification, the term "used cutting agent" means to include not only cutting agents or fluids which are impossible to use and are completely modified with contaminant substances during the repeated use, but also cutting agents or fluids used for the cutting procedure at least one time.

Hitherto, the water-soluble cutting agents are used for cooling of a cut portion between a cutting part and an article to be cut, removal of substances adhered to the cut portion, prevention of adhesion phenomenon, reduction of cutting resistance, removal of cut chips and the like. Therefore, it is unavoidable to incorporate and accumulate solid matter such as cut chips, abrasive material waste, dirt and sand adhered to an article to be cut and the like, and oily material such as oil adhered to an article to be cut, oil leaked from a cutting machine and the like in the cutting agent during the continuous cutting operation. The solid matter roughens a machining surface of the article to be cut, whereby machining accuracy is adversely affected. Additionally, the oily matter forms oil films covering each surface of the cutting agent so as to shut off the contacting with air, resulting in the putrefaction by anaerobic bacteria and the like. And also, finely dispersed oils adhere to abrasive material and the like, resulting in the reduction of the cutting efficiency and accuracy. During the continuous operation, there are further formed microfine and viscous cream-like matters due to the presence of incorporated oils. The increase of the amount of the cream-like matter is relevant to the degradation of the cutting agent, so that the exchange of the cutting agent is determined by the amount of the cream-like matter formed.

Thus, the contamination of the cutting agent resulting from the accumulation of the incorporated material not only lowers the function inherent to the cutting agent, but also shortens the effective usage period of the cutting agent. As a result, the exchange to a fresh cutting agent becomes frequent and hence the amount of the cutting agent used increases, so that the disposed amount of the used cutting agent and the cost accompanied therewith increase.

Therefore, there have hitherto been proposed various methods for the removal of contaminant substances. Among them, the solid matter is removed by (1) separation using a specific gravity difference, (2) filtration or (3) other physical means.

As the separation method (1) using the specific gravity difference, there are known cyclone separation, centrifugal separation, natural settling separation and the like, which are, of course, effective when the specific gravity difference is large. Therefore, they are not effective for the removal of microfine floating matter having a little specific gravity difference. For instance, it is doubtful that these methods are effective for microfine floating matter bonded to oils.

The filtration method (2) is most effective for the removal of solid matter. In this method, however, the filtering resistance rapidly rises due to the clogging of the filter. Particularly, the filtering efficiency is further lowered due to the adhesion of oil in the cutting agent containing oil. That is, the clogging is an inevitable phenomenon and is unavoidable in the filtration method. As a result, the frequency of filter exchange increases, so that only the use of low-cost filters becomes actual. Furthermore, such filters are restricted to ones capable of subjecting to an incineration or the like in the disposal of the exchanged filter. Moreover, there is used no filter that deactivates the function of the water-soluble cutting agent during the filtration. From the above reasons, the effectiveness of the filtration may be reliable, but the development of appropriate filters is still insufficient in the existing circumstances.

As the other physical means (3), there is known a magnetic separation utilizing a magnetic force. However, this method is ineffective for removing cut chips of aluminum and the like having no magnetic property.

Next, the oily matter is removed by well-known oil separating methods, which are divided into (i) physical methods, (ii) physical-chemical methods and (iii) chemical methods.

As the physical method (i), there are methods utilizing a floating force of an oil itself in water (natural separating methods of API, CPI, PPI and the like), which are known as gravity separation, and granulation-separation methods in which microfine oily matter is coalesced to floatable oil droplets for oil separation (coalescer, air floatation, bubble coalescence and the like). As means for filtering the separated oil, there are further known centrifugal separation, use of various filters, adsorbing filtration with an oil absorbing agent, and the like.

As the physical-chemical method (ii), there is known electrolytic floating or settling method utilizing a cohesive force of a metal hydroxide in the electrolysis.

As the chemical method (iii), there is known flocculating precipitation or floatation by addition of chemicals.

In order to separate oil from aqueous medium, there has hitherto been proposed an optional combination of the above mentioned methods. However, the above oil separation methods are applied to treatments for ordinary oil-containing water or oil-containing waste water, so that each of these methods cannot give satisfactory results for recovering the function of the (used) cutting agent containing the solid and oily matter. On the other hand, the disposal treatment of the used cutting agent is obligated by a regulation for prevention of water pollution, so that it is necessary to take several steps for removal of floating matters, incorporated oils and the like and as a result, the cost required for disposal treatment considerably increases. Moreover, ultrafiltration has also been proposed as a current technique for the disposal treatment of the used cutting agent, but its function is mainly lowered due to the presence of the incorporated oil.

Under the above circumstances, the inventors have made various investigations with respect to the cause and problem of contamination of water-soluble cutting agents and thought that a positive prevention of contamination is effective for the function maintenance of the cutting agent and the improvement of the cutting efficiency and that the replacement frequency of fresh cutting agents can be reduced by recovering the function of the previously contaminated cutting agent so as to obtain the decrease of the amount used and the reduction of the cost for disposal treatment. In viewpoint of the above, the inventors have positively aimed at the prevention of the reduction of the cutting efficiency, the maintenance of the cutting accuracy, the decrease of the amount used with the prolongation of the effective usage period, the reduction of the cost for disposal treatment and the like by preventing the contamination of the water-soluble cutting agent, and made various studies with respect to the development of simple and low-cost means which is easy in its maintenance and can always remove contaminant substances during the cutting operation by attaching to a cutting machine and further enables to recover the function of the previously contaminated cutting agent by purification and reproduction on separate places. In the course of such studies, the cream-like matter has been particularly observed by microscope investigation and other methods and as a result, it is apparent that the cream-like matter consists of microfine oil particles with a particle size of not more than 5 microns and results from the incorporated oils. Now, the inventors took notice of the behavior of such cream-like oily matter and examined a method wherein the solid floating matters and incorporated oils, which are continuously introduced in the cutting operation, can continuously be removed in a clear state near the condition of unused cutting agent in view of actual subjects such as economic reasons, disposability and the like. As a result, it has been found that the filtration process is suitable as a simple and low-cost treatment for removing contaminant substances without damaging the function of the water-soluble cutting agent. However, almost all of the known filters are composed of lipophilic materials having a high oil absorbing property, so that they have the drawback that the filtering resistance is increased by the adsorbed oil and hence the filtering capacity is lowered in a short time to reduce the oil separation effect. Further, it cannot expect to coalesce the cream-like oily matters, which are newly known as described above, in the conventional coalescing process. Moreover, the cream-like oily matters may be removed by the adsorption filtration, but there is a fear that the water-soluble cutting agent is also adsorbed to deactivate the function of the cutting agent. In the filtration process, it is unavoidable to cause the clogging of the filter with microfine incorporated floating oily matters. Therefore, the use of papers is suitable as a disposable filter (low cost, disposability by incineration or the like) coping with the aforementioned problems. However, the usual paper-like sheets are inferior in the waterproofness, pressure resistance, water permeability and oil separating capacity. For this reason, these properties should be imparted to the paper-like sheet. The inventors have confirmed that an oil-water separating filter disclosed in Japanese Patent Application No. 126,413/77 satisfies the above requirements and also when the used cutting agent is filtered through such a filter, the resulting filtrate can be retained in a clear state near the condition of unused cutting agent and as a result, the invention has been accomplished.

The oil-water separating filter to be used in the invention consists of a porous sheet and an oil water separating layer composed essentially of a water-insoluble and water absorbable gel layer and having both an oil-resistant and -repellent function and a water-permeable and -absorbable function, which is formed on a surface portion of the porous sheet to be contacted with a cutting agent and/or portions of the porous sheet serving as flow path. As a filtering medium, use may be made of various synthetic fibers, inorganic fibers, natural fibers, natural pulps, synthetic pulps and the like. Among them, cellulosic pulps (fibers) and polyolefinic pulps (fibers) are preferably used alone or in admixture. Although such a filtering medium has a tendency of absorbing an oil, the filter according to the invention does not absorb the oil because portions of the filtering medium to be adhered with oil are covered with the water-insoluble and water absorbable gel body having no affinity to oil. If the oil is adhered to uncovered portions of the filtering medium, oil particles are subjected to a separating action of the gel layer to grow into oil droplets, so that if the filter is existent in water, the grown oil droplets separate from the filter surface owing to their floating force.

The kind or formation of the water-insoluble and water absorbable gel layer is not particularly restricted, but preferable embodiments may be mentioned as follows:

(1) To an aqueous solution obtained by properly mixing a water-soluble monomer such as acrylamide, calcium acrylate, sodium acrylate or the like with a cross-linking agent such as methylenebisacrylamide, N-methylol acrylamide or the like are added a polymerization catalyst such as ammonium persulfate, sodium persulfate, potassium persulfate, hydrogen peroxide or the like and a condensation catalyst such as ammonium chloride, monoammonium phosphate or the like. The resulting solution is applied to the porous sheet by impregnation, coating, spraying or the like and then dried by heating at about 80°–110° C. to effect polycondensation reaction, whereby the water-insoluble and water absorbable gel layer is formed.

(2) The substance capable of forming water-insoluble gel by swelling in water absorption is used. For instance, a cross-linked product of polyethylene oxide (soluble in a solvent such as toluene and the like) is applied to the porous sheet by impregnation, coating, spraying or the like.

In the filter according to the invention, the water-insoluble and water absorbable gel layer is formed on a surface portion of the porous sheet to be contacted with a cutting agent and/or surface portions thereof serving as flow path, so that it is important that the filtering capacity of the porous sheet is sufficiently retained after the formation of the gel layer. For this purpose, it is desirable to plan the formation of the gel layer so as to meet with the desired filtration system (filtration by natural gravity, filtration under pressure) by the selection of filtering medium counting on the reduction of the porosity (the filtering mediums having a satisfactory porosity and the combination thereof). In the filter, if the water permeability is too high, the separation efficiency of contaminant substances decreases and a tendency of penetrating oil-containing water into a filtrate increases, while if the water permeability is too small, the oil-water separating velocity reduces extremely. Therefore, the filter according to the invention has a basis weight of 80–450 g/m$^2$, preferably 100–200 g/m$^2$ and a water permeability of 10–320 seconds/50 cc/cm$^2$, preferably 50–150 seconds/50 cc/cm$^2$.

According to the invention, it is desirable to subject the filter to a treatment for enhancing or holding an oil-resistant and -repellant function and an oil separating function such as oil collecting, coalescing of oil particles or the like in addition to the formation of the above mentioned gel layer. For instance, an oil repellent such as fluorine compound, chromium-fluorine compounds and so on, a lipophilic agent or oil collecting agent such as stearic acid compounds, silicone compounds, waxy compounds and so on, a surface tension depressant or oil gathering agent such as higher alkyl alcohols, silicone alkylene oxides, fluorine surfactants and so on are added to the aqueous solution for the formation of the water-insoluble and water absorbable gel layer or these additives are applied to the porous sheet before or after the formation of the gel layer by impregnation, coating, spraying or the like. Furthermore, the porous sheet may form a lipophilic part together with the gel layer. For instance, the filtering medium is constructed by papermaking or mix spinning of polyolefinic fibers or pulps, synthetic fibers, glass fibers and the like, whereby the separation effect of oil particles in accordance with gathering→growing→seceding may be improved.

According to the invention, porous sheets satisfying properties required for use in the filter such as water permeability, waterproofness, pressure resistance, durability and the like are widely adoptable without limitation, an example of which is woven fabric, non-woven fabric, paper, foamed sheet or the like. The papers or non-woven fabrics made from cellulosic fibers such as pulp, cotton, rayon, acetylcellulose and the like are used after the waterproofness, pressure resistance and durability are imparted by a reinforcing process as described in Japanese Patent Specification No. 659,628. The woven fabrics such as filter cloth and the like themselves have the filtering properties such as waterproofness, pressure resistance and the like, so that the above mentioned reinforcing process may be omitted, if necessary. Further, a non-woven porous sheet is formed by mixing thermofusable synthetic pulps (e.g., polyolefins, nylon, polystyrenes and so on) and then the synthetic pulps are bonded to each other by a heat treatment. Alternatively, the porous sheet may be reinforced with a cross-linkable compound such as urea-formalin condensate, melamine-formalin condensate, epichlorohydrin compound, methylol group-containing compound, divinylsulfone compounds and the like by coating, impregnation, spraying or the like without damaging the function of the filter.

As the porous sheet, use may further be made of sheets composed of synthetic fibers such as polyethylene, polypropylene, phenolic resin, polyester and polyamide; sheets composed of inorganic fibers such as glass fiber, ceramic fiber and asbestos; and composites thereof.

In the filter according to the invention, it is preferable to perform a fixing treatment in order to prevent the seceding off of the particular gel layer from the porous sheet. For example, a cationic fixing agent such as polyethyleneimine, epichlorohydrin polyamine, dicyandiamide-formalin condensate and the like or an anionic fixing agent such as urea-formalin condensate, melamine-formalin condensate and the like is used in accordance with the kinds of the gel layer and porous sheet. Such a fixing agent may be applied to the porous sheet by impregnation, coating, spraying or the like before or after the formation of the gel layer or may be incorporated into the solution for the formation of the gel layer.

From the various experiments according to the invention, the followings have been confirmed when the used water-soluble cutting agent is filtered through the oil-water separating filter of the above mentioned structure.

(1) The water-soluble cutting agent itself is not destroyed.
(2) The increase of the filtering resistance which accompanies the adhesion of oil to the filter is less.
(3) The passage of coarse oil droplets is prevented.
(4) The finely dispersed oil particles are coalesced to self-floatable oil droplets.
(5) The microfine cream-like oily matter disappears.
(6) The oily matter is continuously separated. Therefore, there is no increase of oil content in the cutting agent during the filtration.
(7) The occurrence of cream-like matter is not observed during the filtration.
(8) It is desirable to use a filter having a water permeability of 100–200 seconds/50 cc/cm$^2$ for the disappearance of cream-like matter.
(9) It is desirable to use a filter having a water permeability of 50–200 seconds/50 cc/cm$^2$ for the continuous oil separation of the above item (6).
(10) In order to remove the finely dispersed oil particles from the water-soluble cutting agent, it is preferable to use a porous sheet made from the cellulosic pulps and polyolefinic synthetic pulps alone or in admixture.
(11) It is preferable to form the oil-water separating layer composed essentially of the water-insoluble and water absorbable gel layer by the polycondensation process and the application of the well-known water-insoluble and water absorbable synthetic product as mentioned above, which processes have less influence on the stability and the function of the cutting agent.

The method of recycling the cutting agent according to the invention is a simple filtration system and makes it possible to perform the cleaning and purification of the used cutting agent, which have never been achieved in the prior art owing to the difficulties or high cost. The invention has very advantageous merits in industry, because the used cutting agent can be recovered to the unused state.

The invention will now be described in greater detail with reference to the accompanying drawings, wherein.

Figure 1:
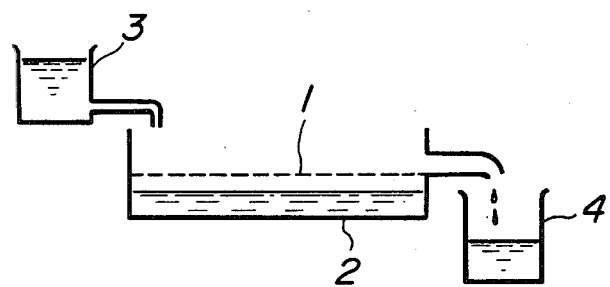
FIG. 1 is a schematic layout of an apparatus for recycling the used cutting agent, which is employed in Example 5 as mentioned below.

The following examples are given in illustration of the invention and are not intended as limitations thereof.

EXAMPLE 1

In this example, filters of six kinds were manufactured by the following manner.

(A) Filtering medium (1) Cellulosic-polyolefinic two component filter

A porous sheet was produced from a two-component mixture of cotton pulp and polyolefinic synthetic pulp (polyethylene, made by Mitsui Zerapac Co., Ltd., trade name "SWP") having a mixing ratio of 1:1 by the usual wet paper-making process. The thus obtained sheet was heated in a drum heating machine at 170° C. under pressure for 2-3 minutes to conduct heat fusion of the synthetic pulp, whereby the waterproofness, pressure resistance and durability of the sheet were intensified.

(2) Cellulosic-polyolefinic three component filter

A porous sheet was produced from a three-component mixture of polypropylene synthetic pulp (made by Chisso Co., Ltd., trade name "Sinpal"), polyethylene synthetic pulp (made by Mitsui Zerapac Co., Ltd., "SWP") and cotton pulp having a mixing ratio of 1:1:3 and further containing 2% by weight per total pulps of polyvinyl alcohol water-swellable pulp (made by Kuraray Co., Ltd., trade name "Fibribond") by the usual wet paper-making process. The thus obtained sheet was subjected to wire embossing press at 150° C. for 3-4 minutes to perform partial heat fusion (needle punching) of the synthetic pulps, whereby the waterproofness, pressure resistance and durability of the sheet were intensified without damaging the water permeability.

(3) Cellulose single component filter

As the porous sheet, there was used a commercially available filter paper (e.g. Toyo Filter Paper No. 26). Such a filter paper was insufficient in the waterproofness and pressure resistance. Now, these properties were intensified by the process described in Japanese Patent Specification No. 659,628 as follows:

The filter paper was impregnated with an aqueous solution containing 25 g of N-methylol acrylamide, 2.5 g of ammonium persulfate and 2.5 g of ammonium chloride per 500 cc of water at a pick-up ratio (wet) of 100%, dried by preliminary heating at 80°-90° C. and then hardened by heating at 110°-120° C.

The term "pick-up ratio" used throughout the specification is expressed by the following equation:

$$\text{Pick-up ratio} = \frac{W_1 - W_0}{W_0} \times 100$$

wherein $w_0$ is a weight of the filtering medium before impregnation and $w_1$ is a weight of the filtering medium after impregnation.

(B) Formation of oil-water separating layer

The filtering medium obtained in the above item (A) was subjected to the following procedure to form the oil-water separating layer thereon.

(B)-1: Application of well-known water-insoluble and water absorbable synthetic gel layer Fifty grams of a polyethylene oxide cross-linked product (made by Meisei Kagaku Co., Ltd., trade name "Aquapren L 710", 15% toluene solution), 5 g of a fluorine oil-gathering agent (made by Asahi Denka Kogyo Co., Ltd., trade name "Adekaflo-FK 1002") and 2 g of a silicon polymer (made by Toray Silicon Co., Ltd., trade name "SRX-290", 10% toluene solution) were dissolved in 500 cc of toluene. The resulting solution was applied to the filtering medium at a pick-up ratio (wet) of 100% by spraying. After sprayed, the filtering medium was dried in air at 80°-90° C.

(B)-2: Polycondensation process inside the filtering medium

The filtering medium was impregnated with an aqueous solution containing 500 cc of a polymerized product (5% aqueous solution) of N-methylol acrylamide and acrylamide with a weight ratio of 3:1, 5 g of N-methylol acrylamide monomer, 500 cc of hydroxyethyl cellulose (1% aqueous solution), 30 cc of a fluorine oil-repellent agent (made by Asahi Glass Co., Ltd., trade name "Asahiguard AG 520", 5% solution), 1 g of a fluorine oil-gathering agent (made by Asahi Denka Kogyo Co., Ltd., trade name "Adekaflo-FK 1006"), 5 cc of a stearic acid lipophilic agent (made by Du Pont, trade name "Kyron C", 1% solution), 2 g of ammonium persulfate and 2 g of ammonium chloride at a pick-up ratio (wet) of 100% and then dried in a warm air dryer at 80°-90° C. Then, the dried medium was subjected to a heat treatment at 110° C. for 2-3 minutes.

(C) The properties of the filters thus obtained are shown in the following Table 1.

TABLE 1

| Filter No. | Basis weight (g/m²) | Thickness (mm) | Density (g/cm³) | Wet strength at tension (kg) | Wet strength at rupture (kg/cm²) | Water absorption (mm/5 min.) | Water permeability (sec/50° C./cm²) | Oil resistance (hours) |
|---|---|---|---|---|---|---|---|---|
| 1-(B)-1 | 120 | 0.7 | 0.17 | 2.2 | 1.3 | 23 | 60 | 0 |
| 1-(B)-2 | 120 | 0.7 | 0.17 | 2.4 | 2.6 | 32 | 80 | 3< |
| 2-(B)-1 | 120 | 0.8 | 0.15 | 1.3 | 1.0 | 30 | 50 | 0 |
| 2-(B)-2 | 120 | 0.8 | 0.15 | 2.6 | 3.2 | 42 | 75 | 3< |
| 3-(B)-1 | 450 | 1 | 0.45 | 6.7 | 6.2 | 17 | 170 | 0 |
| 3-(B)-2 | 450 | 1 | 0.45 | 7.8 | 7.3 | 25 | 210 | 5< |

Note:
1 In Filter No. 1-(B)-1, 1 represents (1) of the filtering medium (A) and (B)-1 represents (B)-1 of the formation of the oil-water separating layer.
2 Test methods according to TAPPI, JIS

EXAMPLE 2

In this example, a commercially available filter paper (e.g. Toyo Filter Paper No. 26) was used as the filtering medium. The waterproofness and pressure resistance of this filter paper were intensified by impregnating the paper with an aqueous solution containing 25 g of N-methylol acrylamide, 2.5 g of ammonium persulfate and 2.5 g of ammonium chloride per 500 ml of water at a pick-up ratio (wet) of 100%, drying at 80°–90° C. and heating at 100°–120° C.

Then, a solution containing 5 g of a cationic high molecular weight compound (made by Meisei Kagaku Co., Ltd., trade name "AG-Fix") in 200 ml of water and made-up with methanol to a total amount of 500 ml was applied by spraying to the above intensified filter paper at a pick-up ratio (wet) of 100%.

Separately, there were provided a first solution containing 5 g of N-methylol acrylamide, 20 g of acrylamide, 0.5 g of methylenebisacrylamide, 2 ml of dimethylamino propionitrile, 50 g of a fluorine oil-repellent agent (made by Asahi Glass Co., Ltd., trade name "Asahiguard AG530", 15 wt.% solution), 2 g of Adekaflo-FK1006 and 1 g of Adekaflo-FK1005 (which are trade names made by Asahi Denka Kogyo Co., Ltd.) as a fluorine oil-gathering agent per 500 ml of water, and a second solution containing 5 g of ammonium persulfate and 5 g of ammonium chloride per 500 ml of water. These solutions were applied to the filtering medium by contact mix spraying at a mixing ratio of the first solution to the second solution of 20:1 (volume ratio). Thereafter, the filtering medium was dried at 80°–90° C. and subjected to a heat treatment at 100°–110° C. for 2 minutes. The thus obtained filter had the following properties:

| Basis weight (g/m$^2$) | 450 |
|---|---|
| Thickness (mm) | 1 |
| Density (g/cm$^3$) | 0.45 |
| Wet strength | |
| at tension (kg) | 6.7 |
| at rupture (kg/cm$^2$) | 6.3 |
| Water absorption (mm/5 min.) | 1$^-$ |
| Water permeability (sec/50cc/cm$^2$) | 31$^-$ |
| Oil resistance (hours) | 24< |

EXAMPLE 3

A mixture of acrylic synthetic fibers (made by Mitsubishi Rayon Co., Ltd., trade name "Bonnel"), asbestos fibers and polyolefinic synthetic pulps (SWP) with a blending ratio of 5:2:3 was added with 6% by weight per total fibers of polyvinyl alcohol swell adherent pulps (made by Kuraray Co., Ltd., trade name "Fibribond") and then shaped into a porous sheet by the usual wet paper-making process.

The resulting sheet was treated in a drum heating machine at 170° C. for 2–3 minutes to conduct heat fusion of the synthetic pulps, whereby the waterproofness, pressure resistance and durability of the sheet were intensified. Thereafter, the sheet was impregnated with a solution of 0.05% by weight of polyethyleneimine in methanol at a pickup ratio (wet) of 100% to conduct a first fixing treatment for the oil-water separating layer.

Separately, there were provided a first solution containing 25 g of N-methylol acrylamide, 10 g of acrylamide, 0.5 g of methylenebisacrylamide and 2 ml of dimethylamino propionitrile per 500 ml of water, and a second solution containing 5 g of ammonium persulfate and 5 g of ammonium chloride per 100 ml of water. These solutions were applied to the fixed sheet at a pick-up ratio (wet) of 100% by contact mix spraying at a mixing ratio of the first solution to the second solution of 20:1 (volume ratio). Then, the sheet was dried at 80°–90° C. and heated at 100°–110° C. for 2 minutes to form a water-insoluble and water absorbable gel layer thereon.

Further, a solution containing 5 g of a cationic high molecular weight compound (made by Meisei Kagaku Co., Ltd., trade name "AG-Fix") in 200 ml of water and made up with methanol to a total amount of 500 ml was applied to the gel layer-containing sheet by spraying at a pick-up ratio of 50 wt.% and then dried at 100° C. to conduct a second fixing treatment. Thereafter, 20 parts by weight of a solution containing 5 g of N-methylol acrylamide, 20 g of acrylamide, 0.5 g of methylenebisacrylamide, 2 ml of dimethylamino propionitrile, 50 g of a fluorine compound (made by Asahi Glass Co., Ltd., trade name "Asahiguard AG-530", 15 wt.% solution), 2.5 g of Adekaflo-FK1006 and 1 g of Adekaflo-FK1005 (which are trade name made by Asahi Denka Kogyo Co., Ltd.) as a fluorine surfactant per 500 ml of water was contact mixed with 1 part by weight of a solution containing 5 g of ammonium persulfate and 5 g of ammonium chloride per 100 ml of water, and then the resulting mixture was applied to the sheet by spraying at a pick-up ratio (wet) of 100% to form a water absorbable gel layer. Then, the water absorbable gel layer was insolubilized by drying at 80°–90° C. and heating at 100°–110° C. for 2 minutes. The thus obtained filter had the following properties:

| Basis weight (g/m$^2$) | 90 |
|---|---|
| Thickness (mm) | 0.5 |
| Density (g/cm$^3$) | 0.18 |
| Wet strength | |
| at tension (kg) | 3.2 |
| at tear (g) | 48 |
| at rupture (kg/cm$^2$) | 2.3 |
| Water absorption (mm/5 min.) | 43 |
| Water permeability (sec/50 cc/cm$^2$) | 30 |
| Oil resistance (hours) | 24< |

EXAMPLE 4

In this example, a non-destructive test by a filter was made with respect to a water-soluble cutting agent.

The water-soluble cutting agent assumes a milk-white emulsion, which must be stable and should not decompose after passed through the filter.

In this test, there was used a 40 times diluted aqueous solution of a commercially available water-soluble cutting agent (made by Toho Kagaku Co., Ltd., trade name "Graiton 1300"). This cutting agent solution was filtered by suction through each of the filters obtained in Examples 1 and 2 with an effective filtering area of 157 cm$^2$ at a rate of 1 l/min. to obtain a filtrate of 1,500 cc. After the filtrate was subjected to a heat treatment in boiling water for 3 hours, an amount of liquid layer separated by thermal decomposition was quantified by using a Babcock flash. The filtration operation was carried out at 1–3 times. The measured results are shown in the following Table 2.

TABLE 2

| Liquid layer separated from water-soluble cutting agent by thermal decomposition Number of filtration | | | Thermal decomposed layer of water-soluble cutting agent to be tested |
|---|---|---|---|
| 1 | 2 | 3 | |
| | | | |

| Filter No. | (vol. %) | (vol. %) | (vol. %) | (vol. %) |
|---|---|---|---|---|
| Filters of Example 1 | | | | |
| 1-(B)-1 | 0.05 | 0.05 | 0.05 | |
| 1-(B)-2 | 0.05 | 0.05 | 0.05 | |
| 2-(B)-1 | 0.05 | 0.05 | 0.05 | 0.10 |
| 2-(B)-2 | 0.05 | 0.05 | 0.05 | |
| 3-(B)-1 | 0.05 | 0.05 | 0.05 | |
| 3-(B)-2 | 0.05 | 0.05 | 0.05 | |
| Filter of Example 2 | 0.10 | 0.25 | 0.50 | |

When the emulsion of the water-soluble cutting agent is unstable during the passage through the filter, numerical values in the data of Table 1 increase. Now, it is apparent from the results of Table 1 that the filters according to the invention do not destroy the water-soluble cutting agent during the filtration. In the filter of Example 2, a part of the water-soluble cutting agent emulsion is destroyed due to the fact that the water permeability of the filter is somewhat poor owing to small pore size thereof.

EXAMPLE 5

In this example, an oil separating capacity of the filter according to the invention was tested with respect to the oil content of the water-soluble cutting agent by using an apparatus shown in FIG. 1.

In a container 3 was charged 1,000 cc of a 40 times diluted aqueous solution of the same water-soluble cutting agent as used in Example 4, to which was added 10 cc of light spindle oil and then the resulting mixture was vigorously stirring with a household mixer for 10 minutes. After stirred, the oil-containing water-soluble cutting agent solution was poured into a slightly inclined trough vessel 2 provided at its middle position with a filter 1 having an effective filtering area of 21×4 cm at a rate of 50 cc/min. In this case, the solution was divided into a filtrate passing through the filter 1 and a liquid flowing from the surface of the slightly inclined filter 1 into a vessel 4. If the filter 1 does not have an oil separating capacity, the filtrate contains a large quantity of oil, while if the filtering capacity of the filter 1 is lowered due to the oil adhesion or the like, the quantity of the liquid flowing on the surface of the filter increases.

The oil quantities in the filtrate and the flowing liquid were quantified in the same manner as described in Example 4. The measured results are shown in the following Table 3.

TABLE 3

| Filter No. | Filtrate | | | Flowing liquid | | | Oil separation efficiency $\frac{B}{A+B} \times 100$ (%) |
|---|---|---|---|---|---|---|---|
| | Quantity of filtrate (cc) | Oil content (vol. %) | A Total oil quantity (cc) | Quantity of flowing liquid (cc) | Oil content (vol. %) | B Total oil quantity (cc) | |
| Filters of Example 1 | | | | | | | |
| 1-(B)-1 | 765 | 0.25 | 1.9 | 240 | 3.6 | 8.6 | 81.9 |
| 1-(B)-2 | 630 | 0.13 | 0.8 | 375 | 2.5 | 9.5 | 92.2 |
| 2-(B)-1 | 890 | 0.50 | 4.5 | 110 | 5.0 | 5.5 | 55.0 |
| 2-(B)-2 | 655 | 0.31 | 2.0 | 340 | 2.4 | 8.2 | 80.4 |
| 3-(B)-1 | 435 | 0.25 | 1.1 | 570 | 1.6 | 9.3 | 89.4 |
| 3-(B)-2 | 253 | 0.10 | 0.3 | 752 | 1.4 | 10.3 | 97.2 |
| Filter of Example 2 | 205 | 0.05 | 0.1 | 800 | 1.3 | 10.2 | 99.0 |
| Unprocessed filter | | | | | | | |
| 1-(B)-1 | 912 | 0.88 | 8.0 | 96 | 2.1 | 2.0 | 20.0 |

Note:
The oil content of the cutting agent to be tested itself is 0.1%.

EXAMPLE 6

In this example was measured the coalescing effect of the filter according to the invention with respect to finely dispersed oil particles.

In general, the filter using a porous sheet as a filtering medium passes microfine oil particles having a particle size smaller than the pore size of the filter. According to the invention, however, the filter has a lipophilic portion for gathering finely dispersed oil particles, so that when the finely dispersed oil particles grow into self-floatable oil droplets, these grown oil droplets secede from the filter under an action of a lipophobic portion composed essentially of water-insoluble and water absorbable gel layer, which is adjacent to the lipophilic portion. By this theory, the finely dispersed oil particles are coalesced to self-floatable oil droplets.

1,500 cc of a 40 times diluted aqueous solution of the same water-soluble cutting agent as used in Example 4 was added with 75 cc of light spindle oil and then vigorously stirred with a household mixer for 10 minutes. The resulting mixture was completely filtered by suction through a filter having an effective filtering area of 157 cm$^2$ at a rate of 1 l/min. Instantly, 600 cc of the filtrate was placed in a cylindrical funnel with an inner diameter of 5 cm.

Thereafter, 50 cc of a sample solution was taken out from the bottom of the funnel every 10 minutes and then the oil concentration of the sample solution was quantified in the same manner as described in Example 4.

During the sampling, the coalesced oil droplets rise upwardly in the funnel alone. The larger the size of the oil droplets, the faster the self-floatation, so that the rising oil droplets are rapidly distributed in the upper part of the filtrate. Therefore, the change of oil concentration in the sample solution taken out every 10 minutes is relevant to the oil distribution accompanied with the floatation of oil droplets and exhibits a large or small floating velocity of oil droplets. That is, the sample solution taken out at an elapsed time of zero contains substantially a constant oil concentration independently of the kind and presence of the filter because the oil droplets are distributed in the filtrate at substantially a homogeneous state. When using a filter developing an excellent coalescing effect, the coalesced oil droplets rapidly rise in the filtrate charged into the funnel with lapse of time, so that the oil concentration of the sample solution taken out from the bottom of the funnel decreases. Therefore, the feature that the oil concentration of the sample solution taken out at an earlier time from the beginning of the experiment is low means that the coalescing effect of the filter against the finely dispersed oil particles is large. The measured results for the oil concentration of the sample solution are shown in the following Table 4.

TABLE 4

| Filter No. | Oil concentration of sample solution taken out every 10 minutes (vol. %) Lapse time from the beginning of experiment (minutes) | | | | | | | |
|---|---|---|---|---|---|---|---|---|
| | 0 | 10 | 20 | 30 | 40 | 50 | 60 | 70 |
| No filter | 2.10 | 1.00 | 0.90 | 0.85 | 0.65 | 0.75 | 0.90 | 1.00 |
| Filters of Example 1 | | | | | | | | |
| 2-(B)-1 | 2.50 | 0.35 | 0.30 | 0.25 | 0.25 | 0.28 | 0.30 | 0.35 |
| 2-(B)-2 | 2.80 | 0.25 | 0.25 | 0.25 | 0.25 | 0.26 | 0.28 | 0.30 |
| 3-(B)-1 | 2.10 | 0.05 | 0.05 | 0.05 | 0.05 | 0.05 | 0.05 | 0.05 |
| 3-(B)-2 | 2.70 | 0.05 | 0.05 | 0.05 | 0.05 | 0.05 | 0.05 | 0.05 |
| Commercially available filter paper (Toyo Filter Paper No. 26) | 2.10 | 0.65 | 0.55 | 0.55 | 0.55 | 0.80 | 0.85 | 0.90 |

Note
The oil content of the water-soluble cutting agent to be used itself is 0.1%.

EXAMPLE 7

Figure 2:
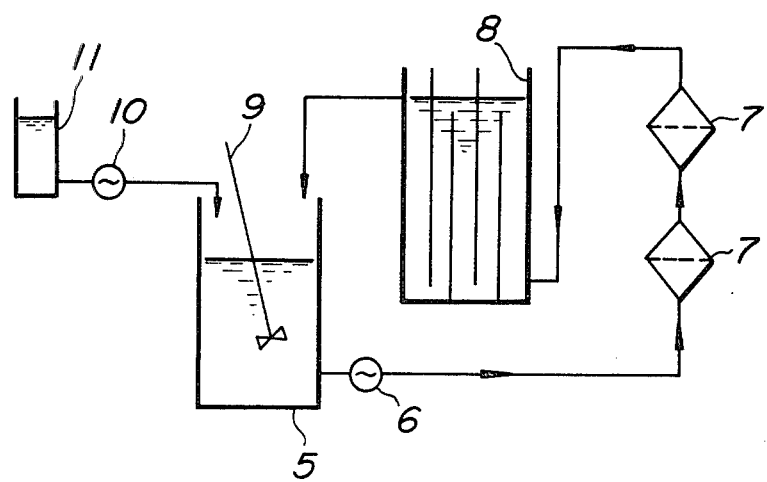
FIG. 2 is a schematic layout of an apparatus for the continuous recycling of the used cutting agent, which is employed in Example 7 as mentioned below.

In this example, the oil separating test of the filter was carried out when an oil was continuously added to a water-soluble cutting agent using an apparatus shown in FIG. 2.

In a tank 5 for the cutting agent was charged with a 40 times diluted aqueous solution of the same water-soluble cutting agent as used in Example 4. To the cutting agent solution was added light spindle oil from an oil tank 11 through a metering pump 10 at a rate of 1.6 cc/min. for 5 minutes, and then the resulting mixture solution was filtered for 30 minutes. This procedure of oil addition and filtration was repeated again. The filtration was carried out by feeding the solution from the tank 5 through a liquid feeding pump 6 to a filter 7 provided with two sheets each having an effective filtering area of 157 cm² and turning a filtrate from the filter 7 through an oil recovering tank 8 provided with four partition plates back to the tank 5. In this case, the filtering pressure was 0.5–0.7 kg/cm² and the flow rate was 1 l/min. This procedure was repeated properly. Moreover, the solution in the tank 5 was always stirred with an oil-mixing propeller 9 at a speed of 500 rpm and the total amount of the cutting agent solution used was 20 l. The oil concentration of the solution in the tank 5 was measured in the same manner as described in Example 4 to obtain a result as shown in FIG. 3.

Figure 3:
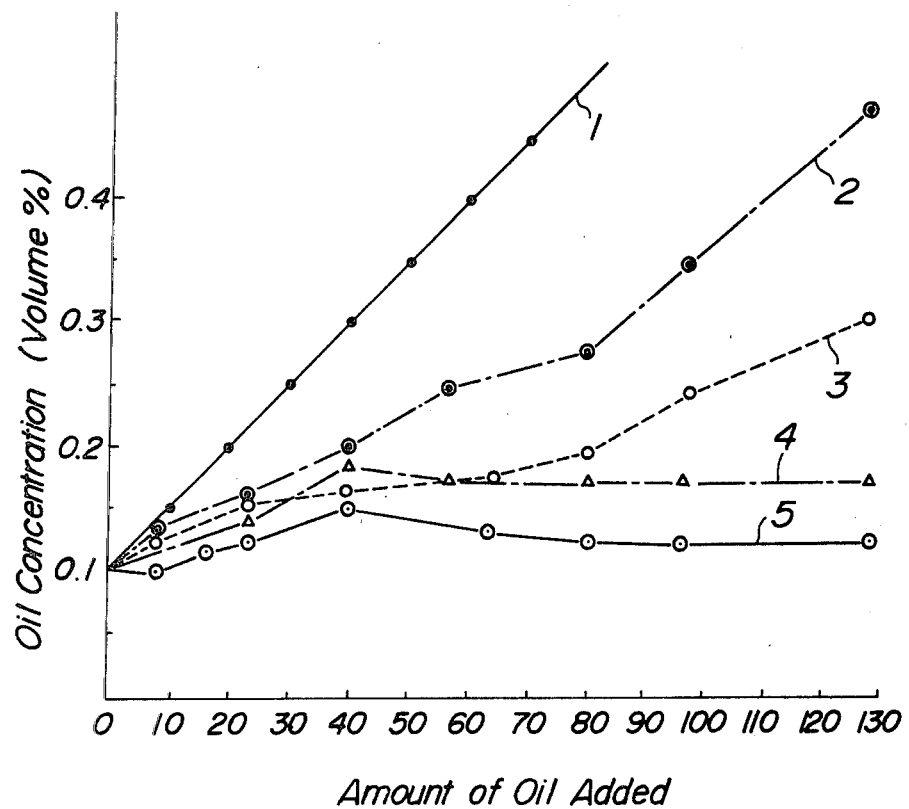
FIG. 3 is a graph showing a relation between the amount of oil added and the oil concentration.

In FIG. 3, a curve 1 represents an increase of oil concentration obtained by calculation, a curve 2 represents an actual increase of oil concentration in the solution using no filter, a curve 3 represents the change of oil concentration when using Toyo Filter Paper No. 26 as a filter, a curve 4 represents the change of oil concentration when using 2-(B)-2 filter of Example 1, and a curve 5 represents the change of oil concentration when using 3-(B)-2 filter of Example 1.

According to the invention, the finely dispersed oil particles are coalesced by the action of the filter, so that they rapidly rise in the oil recovering tank 8 and are collected by the partition walls. Therefore, the oil content of the circulating solution becomes constant at a concentration slightly higher than the oil concentration of the cutting agent itself of 0.1% without rising.

EXAMPLE 8

In this example, the test was made with respect to the occurrence and disappearance of cream-like oily matter.

The occurrence of cream-like oily matter results from oil incorporated into the cutting agent solution. In the procedure of Example 7, when the stirred solution containing an oil content of 3.8% was left to stand after the stop of the filtration was produced in the solution. In actual cutting spots there is frequently produced a serious amount of the cream-like layer, which is clearly different from the case of using the water-soluble cutting agent containing no incorporated oil. When the cream-like oily layer is observed by a microscope, the layer consists of microfine oil particles with a particle size of 1–2 micron, which are undistinguishable from particles of the cutting agent.

Figure 4:
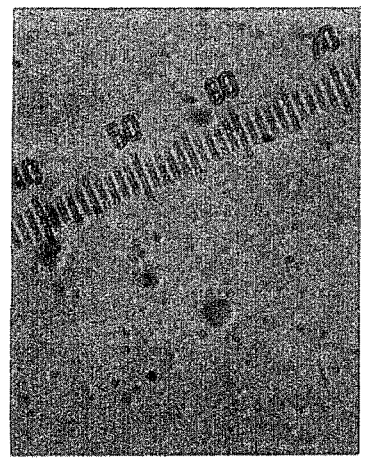
FIG. 4 is a photomicrograph showing the cutting agent containing no oil.
Figure 5:
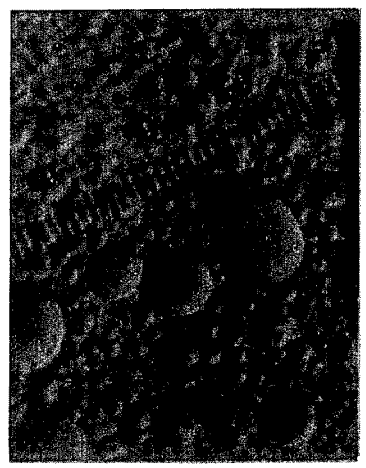
FIG. 5 is a photomicrograph showing the formation of cream-like matter in the cutting agent.
Figure 6:
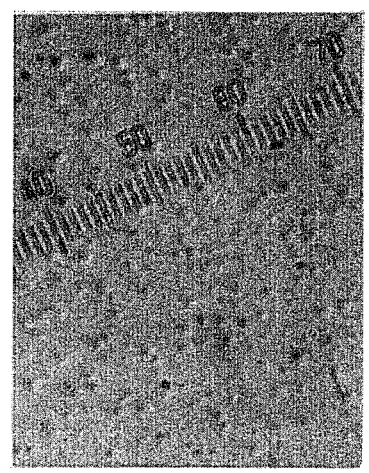
FIG. 6 is a photomicrograph showing the cutting agent after treatment by the method according to the invention.

In FIG. 4 is shown a photomicrograph of the cutting agent solution before addition of light spindle oil in Example 7, and FIG. 5 is a photomicrograph showing the occurrence of the cream-like oily layer after the cutting agent solution is mixed with the light spindle oil to an oil content of 3.8% with stirring and then left to stand. When the thus contaminated cutting agent solution was filtered through the apparatus shown in FIG. 2 provided with Filter No. 3-(B)-2 at a filtering pressure of 0.8 kg/cm² and a rate of 2 l/min., the oil content was reduced from 3.8% to 0.5% after 10 minutes of the filtration and further reduced to 0.25% after 20 minutes of the filtration. When the filtrate was observed by a microscope, the cream-like oily layer disappeared as shown in FIG. 6 and the cutting agent solution became clean. Moreover, the viscosity of the cutting agent solution before the filtration at 20° C. was 4 centipoises (measured by a Brook field rotational viscometer), while that after the filtration was 1 centipoise.

EXAMPLE 9

Figure 7:
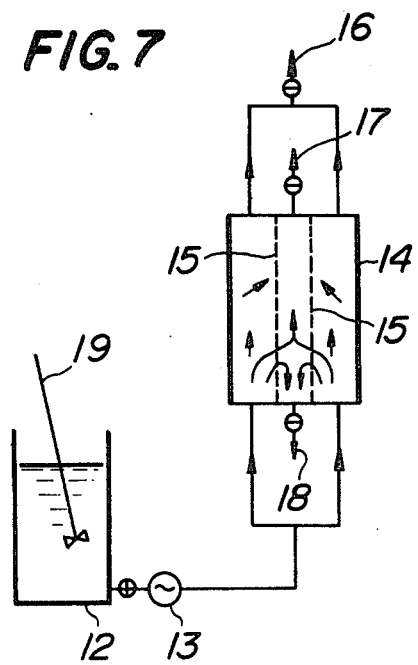
FIG. 7 is a schematic layout of an apparatus for recycling the used cutting agent by water supply under pressure, which is employed in Example 9 as mentioned below.

In this example is shown a relation between behaviors of coarse oil droplets and microfine oil particles and coalescing effect and liquid passing velocity of a filter using an apparatus for filtration under pressure as shown in FIG. 7.

In a container 12 was charged 20 l of a 40 times diluted aqueous solution of the same cutting agent as used in Example 4, to which was added 500 cc of light spindle oil, and then the resulting mixture was stirred with a propeller 19 at a rate of 500 rpm for 20 minutes to thoroughly disperse the oil into the solution. Such a stirring was continued during the experiment. Thereafter, the mixed solution was fed from the container 12 through a liquid feeding pump 13 to a filtration tank 14 provided with two filters 15 each having an effective filtering area of 8×15 cm at a predetermined flow rate. The solution flowed in the tank 14 was distributed in an unfiltered portion 16 flowing on the surface of the filter, an upper filtrate portion 17 containing microfine oil particles and coalesced oil droplets, which passed through the filter, and a lower filtrate portion 18. The flow ratio of the unfiltered portion 16 to the upper filtrate portion 17 to the lower filtrate portion 18 was adjusted to three conditions of 1:1:3, 1:2:2 and 2:1:2 by means of valves arranged in the respective discharge ports and then the oil content of each of these portions was quantified in the same manner as described in Example 4. The measured results are shown in the following Table 5.

According to this experiment, coarse oil droplets in the solution cannot pass through the filter, while water easily passes through the filter, so that the oil content is concentrated in the unfiltered portion 16 and as a result, the oil content of the filtrate becomes less. On the other hand, the filtrate contains microfine oil particles passing through the filter 15, which are coalesced by the coalescing action of the filter 15. However, the coalesced oil droplets rapidly rise upward owing to their floatating force, so that the oil content of the upper filtrate portion 17 becomes higher than that of the lower filtrate portion 18. That is, if the filter 15 has a satisfactory oil separating function, the oil content reduces in the order of the unfiltered portion 16→the upper filtrate portion 17→the lower filtrate portion 18.

As apparent from the data of Table 5, the filters according to the invention develop satisfactory oil separating function, so that there can be obtained the filtrate having less oil content.

TABLE 5

| Filter No. | Total flow rate (l/min.) | Flow ratio of portions 16, 17 and 18 | Filtering pressure (kg/cm$^2$) | Oil content of each portion (vol. %) | | |
|---|---|---|---|---|---|---|
| | | | | 16 | 17 | 18 |
| 1-(B)-1 | | | 0.2 | 6.2 | 2.0 | 1.3 |
| 1-(B)-2 | | | 0.3 | 6.0 | 2.8 | 1.1 |
| 2-(B)-1 | | | 0.2 | 5.8 | 1.7 | 1.5 |
| 2-(B)-2 | 0.5 | 1:1:3 | 0.3 | 6.8 | 2.7 | 1.1 |
| 3-(B)-1 | | | 0.5 | 7.3 | 1.2 | 1.2 |
| 3-(B)-2 | | | 0.7 | 7.4 | 1.4 | 1.1 |
| Unprocessed filter of 2-(B) | | | 0.2 | 3.6 | 2.1 | 2.1 |
| 1-(B)-1 | | | 0.2 | 6.0 | 2.0 | 1.0 |
| 1-(B)-2 | | | 0.3 | 5.9 | 2.3 | 0.8 |
| 2-(B)-1 | | | 0.2 | 5.8 | 1.8 | 1.2 |
| 2-(B)-2 | 0.5 | 1:2:2 | 0.3 | 6.1 | 2.1 | 0.9 |
| 3-(B)-1 | | | 0.5 | 7.2 | 1.7 | 0.7 |
| 3-(B)-2 | | | 0.7 | 7.6 | 1.0 | 0.6 |
| Unprocessed filter of 2-(B) | | | 0.2 | 3.4 | 2.4 | 1.9 |
| 1-(B)-1 | | | 0.1 | 5.4 | 2.2 | 0.6 |
| 1-(B)-2 | | | 0.2 | 4.4 | 2.2 | 0.6 |
| 2-(B)-1 | | | 0.1 | 4.4 | 2.3 | 0.6 |
| 2-(B)-2 | 0.5 | 2:1:2 | 0.2 | 4.3 | 2.4 | 0.5 |
| 3-(B)-1 | | | 0.4 | 4.6 | 2.3 | 0.3 |
| 3-(B)-2 | | | 0.6 | 4.6 | 2.4 | 0.2 |
| Unprocessed filter of 2-(B) | | | 0.1 | 3.0 | 2.1 | 2.0 |

Note:
The oil content of the cutting agent to be used itself is 0.1%.

EXAMPLE 10

Figure 8:
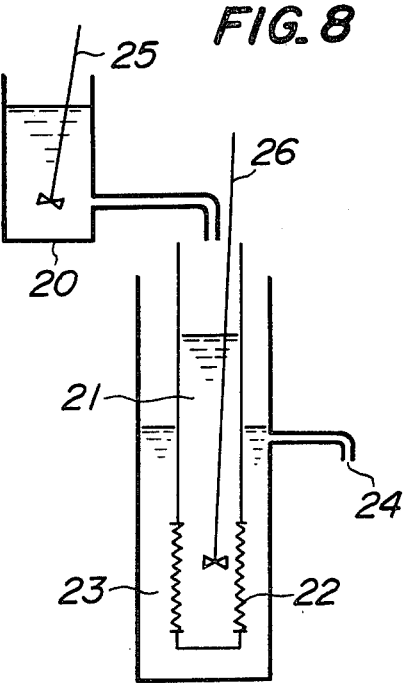
FIG. 8 is a schematic layout of an apparatus for recycling of the used cutting agent, which is employed in Example 11 as mentioned below.

In this example, the behavior of the filter was observed with respect to the water permeability by natural gravity filtration using an apparatus shown in FIG. 8.

In a tank 20 was charged 20 l of a 40 times diluted aqueous solution of the same cutting agent as used in Example 4, to which was added 200 cc of light spindle oil and then the resulting mixture was agitated with a stirring propeller 25 at a rate of 500 rpm for 20 minutes to thoroughly disperse the oil into the solution. Thereafter, the mixed solution was fed from the tank 20 to an inner cylindrical body 21 (15×15×50 cm) provided with two filters 22 each having an effective filtering area of 12×17 cm at a flow rate of 1 l/min. with stirring at 300 rpm. The solution in the cylindrical body 21 was agitated with a stirring propeller 26 at a rate of 100 rpm to prevent oil separation, while a filtrate 23 passing through the filter was discharged from an outlet 24 of an outer cylindrical body. The time required for discharging 1 l of the filtrate was measured every 1 l to obtain a result as shown in the following Table 6, wherein the increase of numerical value shows the degradation of the filtering characteristics or water permeability.

As apparent from the data of Table 6, the filters of 1-(B)-1 to 3-(B)-2 according to the invention have a water permeability substantially equal to that of the unprocessed filter of 3-(B), while the time required for discharge of filtrate even in the filter of Example 2 is not more than 2 times of that of the unprocessed filter of 3-(B), so that there is no trouble in practice.

TABLE 6(a)

| | | Time required for discharging 1l of filtrate (seconds) | | | | | | | | | | | | | | | | |
|---|---|---|---|---|---|---|---|---|---|---|---|---|---|---|---|---|---|---|
| | | Fraction No. (1 fraction: 1l) | | | | | | | | | | | | | | | | |
| Filter No. | Test* | 1 | 2 | 3 | 4 | 5 | 6 | 7 | 8 | 9 | 10 | 11 | 12 | 13 | 14 | 15 | 16 | 17 |
| 1-(B)-1 | A | 62 | 62 | 62 | 62 | 62 | 62 | 62 | 62 | 62 | 62 | 63 | 63 | 62 | 62 | 63 | 63 | 63 |
| | B | 65 | 65 | 65 | 65 | 65 | 65 | 65 | 65 | 65 | 65 | 65 | 65 | 65 | 65 | 67 | 68 | 70 |
| 1-(B)-2 | A | 62 | 62 | 62 | 62 | 62 | 62 | 62 | 62 | 62 | 62 | 62 | 62 | 62 | 62 | 62 | 63 | 63 |
| | B | 65 | 65 | 65 | 65 | 65 | 65 | 65 | 65 | 65 | 65 | 65 | 66 | 67 | 68 | 70 | 72 | 75 |
| 2-(B)-1 | A | 60 | 61 | — | — | 62 | — | 62 | — | 62 | — | 61 | 61 | 61 | 61 | 61 | 61 | 61 |
| | B | 65 | 65 | 65 | 65 | 65 | 65 | 65 | 65 | 65 | 65 | 65 | 65 | 65 | 65 | 66 | 66 | 67 |
| 2-(B)-2 | A | 60 | 61 | 62 | 62 | — | — | — | 62 | 62 | — | — | 61 | — | — | 61 | 61 | 62 |
| | B | 65 | 65 | 65 | 65 | 65 | 65 | 65 | 65 | 65 | 65 | 65 | 65 | 65 | 65 | 67 | 68 | 70 |
| 3-(B)-1 | A | 83 | 81 | 80 | 80 | 80 | 80 | 80 | 80 | — | — | 80 | 80 | — | — | 80 | 80 | 80 |
| | B | 83 | 83 | 83 | 83 | 83 | 83 | 83 | 83 | 83 | 85 | 86 | 88 | 90 | 93 | 95 | 96 | 98 |
| 3-(B)-2 | A | 83 | 83 | 83 | 83 | — | — | 83 | — | — | 83 | — | — | 83 | — | — | 83 | 83 |
| | B | 85 | 86 | 87 | 87 | 87 | 87 | 87 | 87 | 87 | 87 | 88 | 88 | 88 | 89 | 90 | 90 | 90 |

TABLE 6(b)

| Filter No. | Test* | \multicolumn{17}{c}{Time required for discharging 1l of filtrate (seconds) Fraction No. (1 fraction: 1l)} |
| | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Unprocessed filter of 3-(B) | A | 61 | — | 61 | — | 61 | — | — | 67 | — | — | 61 | — | — | 61 | — | — | — |
| | B | 62 | 62 | 62 | 62 | 64 | 65 | 67 | 67 | 70 | 70 | 73 | 75 | 77 | 80 | 85 | 90 | 95 |
| Filter of Example 3 | A | 61 | 61 | — | — | 61 | — | — | — | 61 | — | — | — | — | 61 | — | — | 62 |
| | B | 62 | 62 | 62 | 62 | 64 | 65 | 68 | 70 | 74 | 78 | 83 | 90 | 95 | 103 | 108 | 115 | 125 |
| Filter of Example 2 | A | 90 | 90 | — | 90 | — | — | 90 | — | — | — | 90 | — | — | 90 | — | — | — |
| | B | 95 | 95 | 95 | 95 | 95 | 95 | 95 | 97 | 100 | 105 | 112 | 120 | 127 | 137 | 145 | 155 | 170 |

A: Cutting agent solution containing no oil
B: Oil-containing cutting agent solution In general, when oil-containing solution is filtrated through a filter, finely dispersed oil particles are coalesced by Darmy's theory during the filtration. The coalescing tendency is recognized in all of filters having micropores therein. In the usual filters, the coalesced oil droplets have a negligible tendency to secede off from the filter, which is a cause of lowering the filtering velocity. In order to prevent the lowering of the filtering velocity, it is necessary to enlarge the pore size of the filter. In this case, however, it cannot be expected to coalesce the finely dispersed oil particles by Darmy's theory. On the other hand, the filters to be used in the invention solve the above problems and have the function of coalescing the finely dispersed oil particles and rapidly seceding off the coalesced oil droplets from the filter, so that the used cutting agent can efficiently be recycled and purified according to the invention.

What is claimed is:

1. A method of recycling and purifying an aqueous solution of a water-soluble cutting agent, comprising the step of filtering a used solution of water-soluble cutting agent containing water, a water-soluble cutting agent and an oil contaminant through an oil-water separating filter, said oil-water separating filter comprising a porous sheet having thereon an oil-water separating layer, said layer consisting essentially of a water-insoluble and water-absorbing gel layer having both an oil-resistant and oil-repellent function and a water-permeable and water-absorbing function, said layer being formed on the portion of said porous sheet which is contacted by said cutting agent.

2. A method as claimed in claim 1, wherein said gel layer comprises a polymeric material.

3. A method as claimed in claim 2, wherein said gel layer has been formed by polycondensation.

4. A method as claimed in claim 1, wherein said porous sheet comprises a plurality of strands, and said gel layer comprises a coating on said strands throughout said filter.

5. A method as claimed in claim 4, wherein said filter has a basis weight of 100–200 g/m$^2$ and a water permeability of 50–150 seconds/50 cc/cm$^2$.

6. A method as claimed in claim 1, wherein said gel layer contains an oil repellant agent, an oil collecting agent, and a surface tension depressant or oil gathering agent.

7. A method as claimed in claim 1, wherein tiny oil droplets in said solution are caught by said filter and coalesce to form larger oil droplets, which then secede from said filter.

8. A method as claimed in claim 1, wherein said porous sheet is selected from cellulosic pulps, polyolefinic synthetic pulps and a mixture thereof.

9. A method as claimed in claim 1, wherein said filter has a basis weight of 80–450 g/m$^2$ and a water permeability of 10–320 seconds/50 cc/cm$^2$.

* * * * *